(12) United States Patent
Grover et al.

(10) Patent No.: US 11,262,003 B2
(45) Date of Patent: Mar. 1, 2022

(54) INTEGRAL FLUID CONDUIT

(71) Applicant: General Electric Company, Schenectady, NY (US)

(72) Inventors: Varun Grover, Bangalore (IN); Jared Matthew Wolfe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 16/310,838

(22) PCT Filed: Jun. 15, 2017

(86) PCT No.: PCT/US2017/037591
§ 371 (c)(1),
(2) Date: Dec. 18, 2018

(87) PCT Pub. No.: WO2018/005106
PCT Pub. Date: Jan. 4, 2018

(65) Prior Publication Data
US 2020/0309287 A1    Oct. 1, 2020

(30) Foreign Application Priority Data
Jun. 30, 2016   (IN) ............................. 201641022394

(51) Int. Cl.
*F16L 9/19* (2006.01)
*F02C 7/22* (2006.01)
*F15B 21/00* (2006.01)

(52) U.S. Cl.
CPC ............... *F16L 9/19* (2013.01); *F02C 7/222* (2013.01); *F15B 21/00* (2013.01)

(58) Field of Classification Search
CPC ..................................... F16L 9/19; F02C 7/222
(Continued)

(56) References Cited

U.S. PATENT DOCUMENTS

2009/0255602 A1* 10/2009 McMasters ............. F23R 3/286
138/115
2010/0051726 A1   3/2010 Houtman et al.
(Continued)

FOREIGN PATENT DOCUMENTS

CN       1139735 A    1/1997
CN     103062800 A    4/2013
(Continued)

OTHER PUBLICATIONS

International Search Report and Written Opinion dated Sep. 19, 2017 which was issued in connection with PCT application No. PCT/US17/37591 which was filed on Jun. 15, 2017.
(Continued)

*Primary Examiner* — Paul J Gray
(74) *Attorney, Agent, or Firm* — Dinsmore & Shohl LLP

(57) ABSTRACT

A integrated fluid conduit is provided having two or more internal conduits, the size and shape of the internal conduits is designed to optimize the hydraulic diameter of each conduit based on the needs of the system. The integrated fluid conduit is advantageously manufactured according to additive manufacturing techniques which enable formation of off-center and/or non-concentric internal conduits adapted to specific applications requiring turns such as the fuel delivery system or the hydraulic system of/on a gas turbine engine for an airplane.

20 Claims, 9 Drawing Sheets

(58) Field of Classification Search
USPC .................................................. 138/115–118
See application file for complete search history.

(56) References Cited

U.S. PATENT DOCUMENTS

| | | | | |
|---|---|---|---|---|
| 2014/0096857 | A1* | 4/2014 | Humalainen | ............. F16L 9/19 |
| | | | | 138/116 |
| 2015/0322820 | A1* | 11/2015 | Ott | .......................... F01D 25/24 |
| | | | | 415/208.1 |
| 2015/0323107 | A1 | 11/2015 | Ott et al. | |

FOREIGN PATENT DOCUMENTS

| | | | |
|---|---|---|---|
| CN | 104379879 | A | 2/2015 |
| CN | 204691907 | U | 10/2015 |
| EP | 2942489 | A1 | 11/2015 |
| EP | 2942510 | A1 | 11/2015 |
| WO | 2009148680 | A2 | 12/2009 |

OTHER PUBLICATIONS

U.S. Appl. No. 14/407,400, filed Jun. 14, 2013 by General Electric Company.
U.S. Appl. No. 14/685,631, filed Apr. 14, 2015 by General Electric Company.
Examination Report Priority Search Results for application IN 201641022394 dated Nov. 7, 2019 (7 pages).
International Preliminary Report on Patentability for application PCT/US2017/037591 dated Jan. 1, 2019 (5 pages).
English Translation of Chinese office action for application 201780040168.7 dated Jun. 9, 2020 (14 pages).

* cited by examiner

INTEGRAL FLUID CONDUIT

FIELD OF THE INVENTION

This invention relates to integrated fluid conduit designs having two or more internal fluid conduits with specific internal cross-section design, as well as a desired outer perimeter geometry or curvature of the fluid conduit. The fluid conduits described herein are useful in any application where pressure drop, pressure capability, routing of the conduit, and/or low cycle fatigue life are design variables, such as the fuel delivery system or hydraulic system of a jet airplane.

BACKGROUND

For some fluid systems (tube or duct systems), multiple tubes or ducts are used to separate portions of the system, as required, to make the system functional. The separate fluid portions of a system may vary in pressure, flow rate, temperature and fluid type. Multiple tubes of a system independently require certain design features, such as support equipment and end connections. The separate features and separate tubes must maintain certain clearances during operation and to enable installation and removal.

In the case of a fuel system for a jet aircraft engine, the aircraft engine fuel manifolds are in a harsh environment and are located relatively close to the combustor case. The combustor case grows as the engine warms, but the temperature of the fuel in the manifold stays relatively cool. This temperature difference, coupled with the different material growth rates of various components, creates a thermal loading on the manifold. In a conventional manifold, the length of piping between mounting points (i.e. the nozzle-to-nozzle distance) is fixed, limiting the length of piping available to provide flexibility.

It is also known to provide "staged" fuel delivery systems which include two or more fuel circuits used during different engine operating conditions (e.g., pilot and main circuits). In a conventional fuel manifold, each circuit or stage requires separate piping and connections, increasing weight, complexity, and parts count. Furthermore, the fuel passages within the manifold and other piping are subject to undesirable carbon buildup ("coking") of the residual fuel during periods of time when fuel is not flowing in a particular circuit.

The resulting system requires a certain volume within a turbine engine, and a certain amount of material and parts. The system volume must be covered by a cowl to provide a smooth surface for the external air to flow over. Improvements to engine and aircraft performance may be made through reductions in volume, weight and number of parts by minimizing the required space between separate portions of a system and combining support structure and end fittings.

An integrated fuel system is described in co-pending U.S. patent application Ser. No. 14/685,631 filed Apr. 14, 2015, entitled "Thermally-coupled fuel manifold." As shown in FIG. 1, the integrated fuel supply duct has a pilot primary flow 102, two pilot secondary flows 101, and a main flow line 103. The integrated fuel supply duct is arranged into a fuel supply system for an aircraft jet engine as shown in FIG. 2. One or more ducts 201, 202 may have inlet ports 203, 204 for each of the three flows and matching off-take flanges at fuel nozzle interface locations 205. This system results significant part count reduction and greatly simplified system assembly/packaging when compared to earlier fuel manifold configurations having ring duct/manifold(s) and smaller tappings/pigtails to access each fuel nozzle. This earlier configuration is described in U.S. patent application Ser. No. 14/407,400 filed Dec. 11, 2014, entitled "Fluid Conduit." The disclosures of these earlier-filed patent applications are incorporated by reference herein in their entirety, particularly for their disclosure of aspects of a jet airplane fuel manifold and delivery system unrelated to the fluid conduit design.

One problem encountered in integrated fuel supply duct systems with multiple flows is friction losses. Although larger ducts may be used to limit pressure drop, this adversely impacts system weight and space requirements. For example, such a larger duct with larger hydraulic diameters for each flow leads to a larger, stiffer and bulkier integrated duct, significantly lowering proof/pressure capability and low-cycle fatigue life, and impacting packaging. The short interconnecting ribs, which are necessary for separating flows, may raise stress in the part and further lower its pressure capability and fatigue life. There remains a need for an integrated duct design that limits friction losses while meeting the requirements for low-cycle fatigue life and space requirements.

BRIEF DESCRIPTION OF THE INVENTION

The present invention relates to an integrated fluid conduit. The conduit according to one embodiment of the invention has an outer parameter that defines a central axis of the fluid conduit. It includes a first interior conduit having a center that is offset from the central axis of the fluid conduit. At least a second interior fluid conduit is provided separately from the first interior conduit, and additional interior fluid conduits are optional. The fluid conduit includes at least one bend. Sections of fluid conduit may include several bends. For example, one exemplary fluid conduit section includes seven bends and may be used to connect two fuel nozzles in an integrated fuel manifold/delivery system in a gas turbine engine of a jet airplane. Other applications include using the integrated fluid conduit as part of the hydraulic system of gas turbine engine for an airplane.

In another embodiment, the integrated fluid conduit may have two or more non-concentric interior fluid conduits. The conduit according to one embodiment of the invention has an outer parameter that defines a central axis of the fluid conduit. It includes a first interior conduit and at least a second interior fluid conduit provided separately from the first interior conduit. Additional interior fluid conduits are optional. The first interior fluid conduit and second interior fluid conduit are non-concentric. The fluid conduit includes at least one bend. Sections of fluid conduit may include several bends, making them useful for a variety of applications including those described above.

The integrated fluid conduit of the present invention may be designed with an outer perimeter that is circular, or non-circular. The shape of the interior fluid conduits may be either circular or non-circular. In one embodiment, the integrated fluid conduit may have an outer perimeter that is circular, while having two or more circular or non-circular interior conduits. Alternatively, the outer perimeter of the conduit may have a non-circular perimeter, while having two or more circular or non-circular interior conduits.

DETAILED DESCRIPTION OF THE INVENTION

Figure 3:
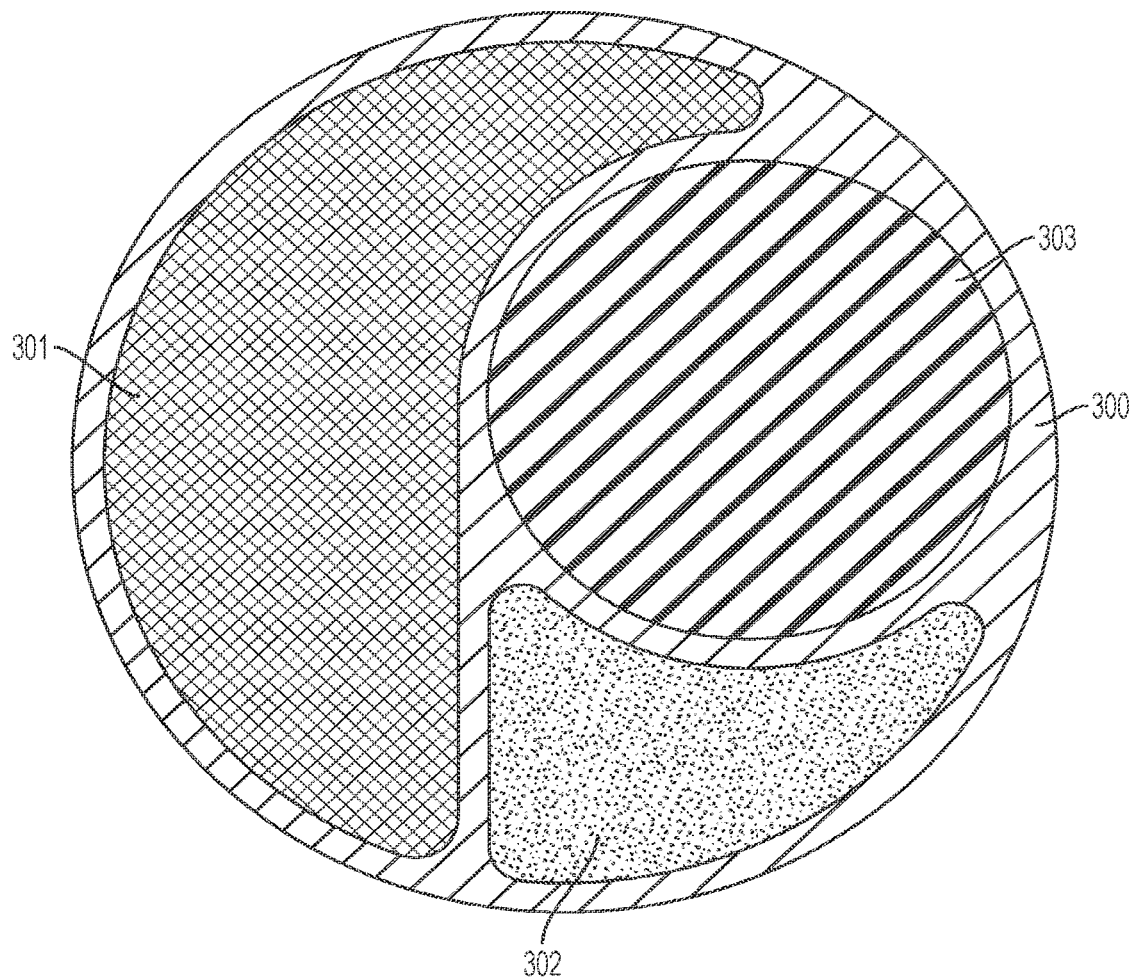
FIG. 3 is a cross-sectional view of an integrated fluid conduit for a fuel delivery system of a jet engine according to an embodiment of the invention.

Shown in FIG. 3 is an integrated fluid conduit according to one aspect of the invention. The integrated fluid conduit 300 of FIG. 3 is optimized for fuel delivery in a gas turbine engine of a jet airplane. As discussed above, the fuel delivery system in the gas turbine engine of a jet airplane is a harsh environment that requires specific design constraints. The conduit includes a pilot secondary line 301, a pilot primary line 302, and a main fuel line 303. The cross section of FIG. 3 strategically places high-pressure fluid in a circular flow-profile 303 to minimize hoop stress, addressing proof capability issue, and places relatively-low-pressure channels in remaining non-circular flow-profiles 301, 302, balancing pressure forces in the integrated duct 300. A trade-off between flow area, flow velocity, and wetted perimeter of each of the three passages was sought to optimize and improve hydraulic diameters and limit friction losses. Target hydraulic diameter for high-pressure flow was set and the low-pressure-flow passages were developed around it until the target hydraulic diameters for each flow were achieved. This resulted in an optimal cross-section, addressing the space/packaging issue, and hence, lowering weight.

Figure 4:
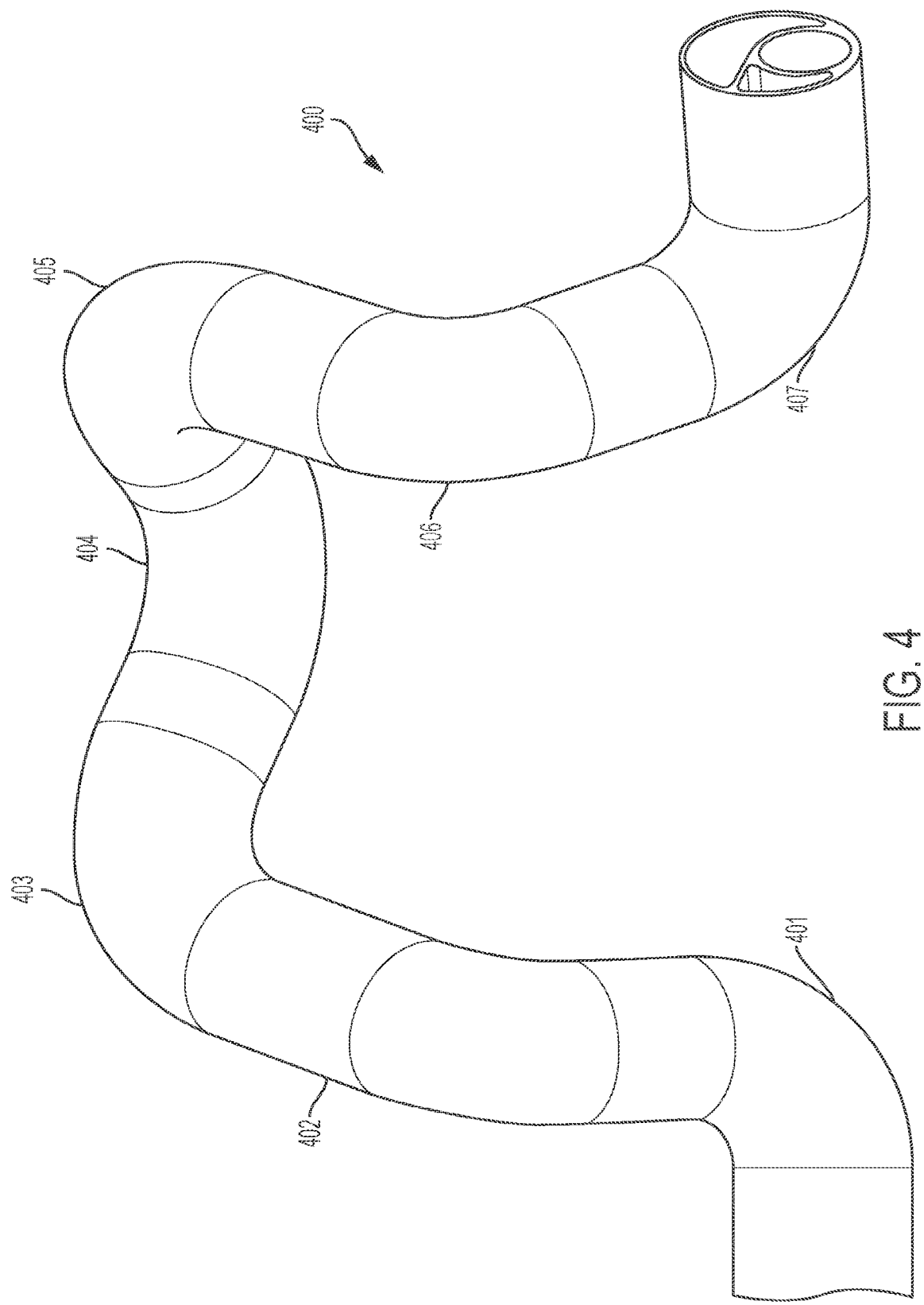
FIG. 4 is a side view showing the integrated fluid conduit of FIG. 3, showing the plurality of bends.

The low-cycle fatigue life was improved by using a symmetric and adequately long duct 400. As shown in FIG. 4, each section of duct includes seven bends 401, 402, 403, 404, 405, 406, and 407 that lower bending stiffness and improve flexibility of the duct. The bends in the fluid conduit have a radius of curvature ranging from less than twice the diameter of the fluid conduit to softer bends on the order of less than five times the diameter of the fluid conduit. A circular outer duct profile was retained as it would allow for adding standard structural damping features, such as clamps, later on in the design cycle, if deemed necessary, to lower vibration response and achieve required high-cycle fatigue life. However, for further lowering of the weight of integrated conduit, a non-circular outer duct profile, discussed below with reference to FIG. 7, may be used in a specific lower engine vibration environment or where alternate damping methods/devices are available for use.

Figure 1:
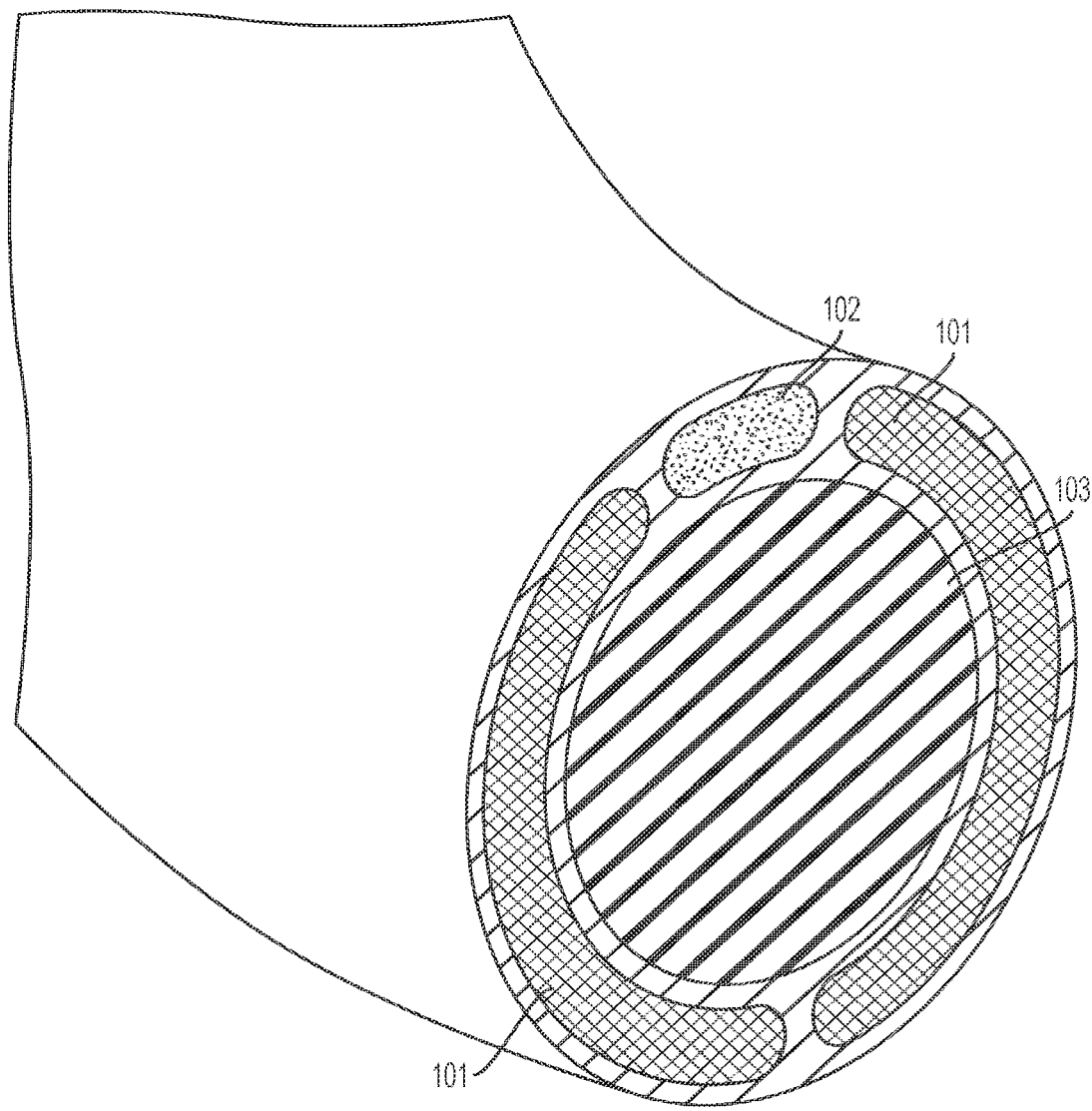
FIG. 1 is a cross-sectional view of an integrated fluid conduit for a fuel delivery system of a jet engine.
Figure 5:
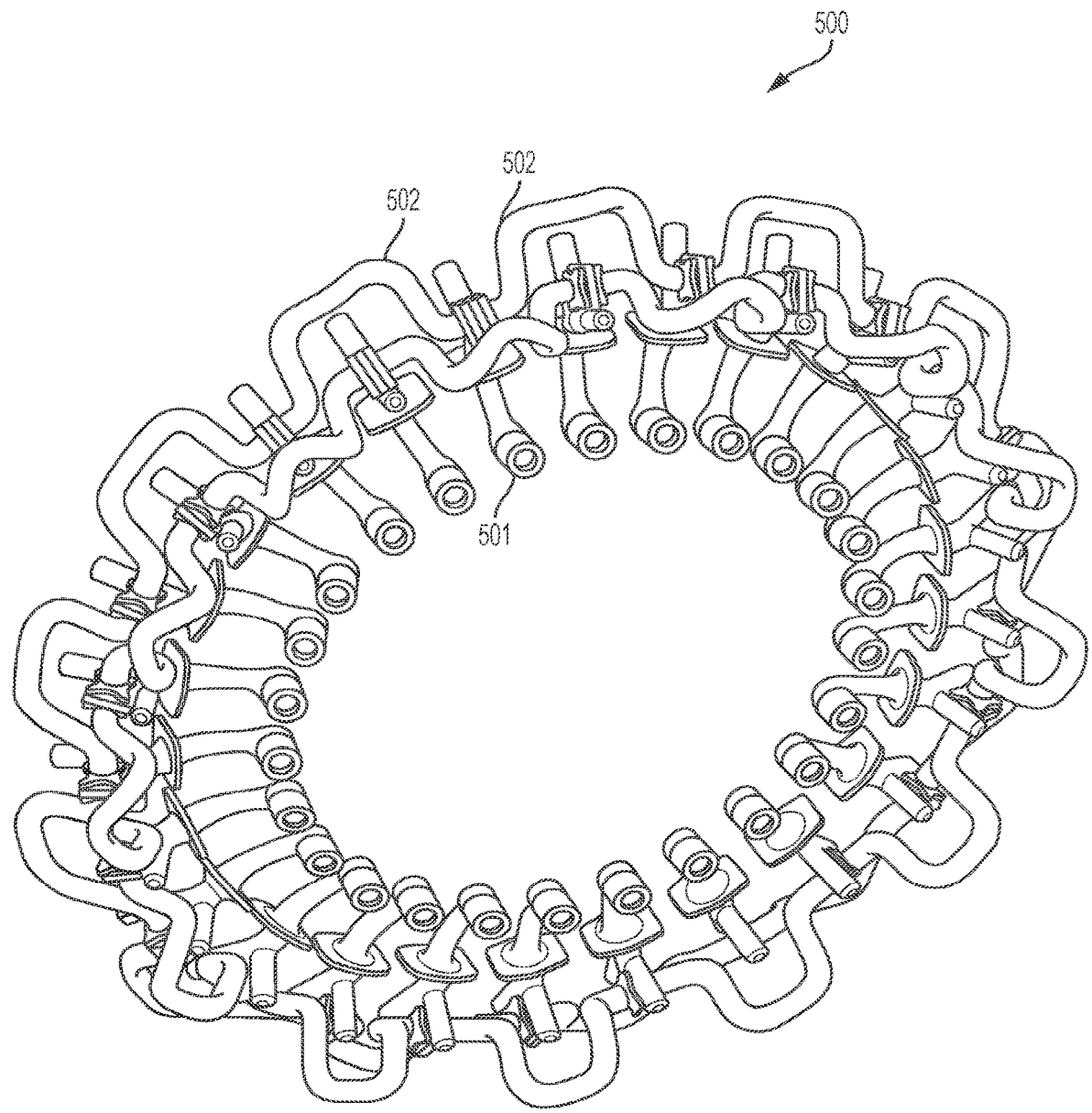
FIG. 5 shows an integrated fuel manifold/delivery system utilizing the integrated fluid conduit of FIGS. 3 and 4.
Figure 6:
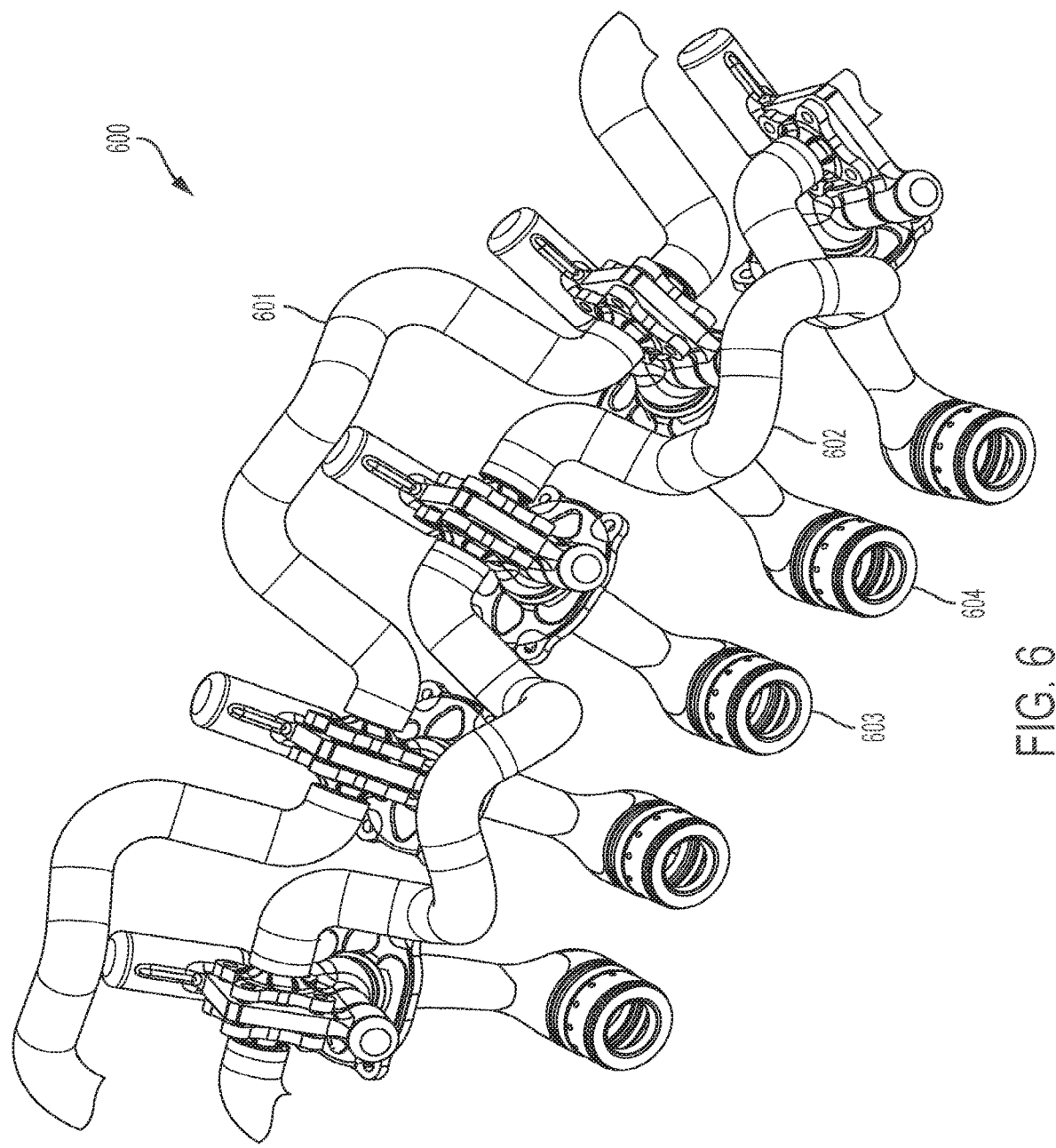
FIG. 6 is a close-up view of FIG. 5 showing how the integrated fluid conduit of FIGS. 3 & 4 may be connected to the fuel delivery nozzle.

As shown in FIG. 5, the integral duct 400 of FIG. 4 is utilized in the design of a fuel delivery manifold system 500 where fuel is delivered directly from the integral duct 502 to fuel nozzles 501. With the baseline cross-section of FIG. 1, it was challenging to meet the pressure drop and proof-pressure requirements while remaining within the permitted weight and space bounds. The proposed cross-section 300 of FIG. 3 addressed pressure drop requirement and proof capability for the fuel manifold concept. FIG. 6 shows a close-up of the fuel manifold system shown in FIG. 5. The arrangement of ducts 601, 602 in the fuel manifold system 600 is staggered about the fuel nozzles 603, 604.

Figure 7:
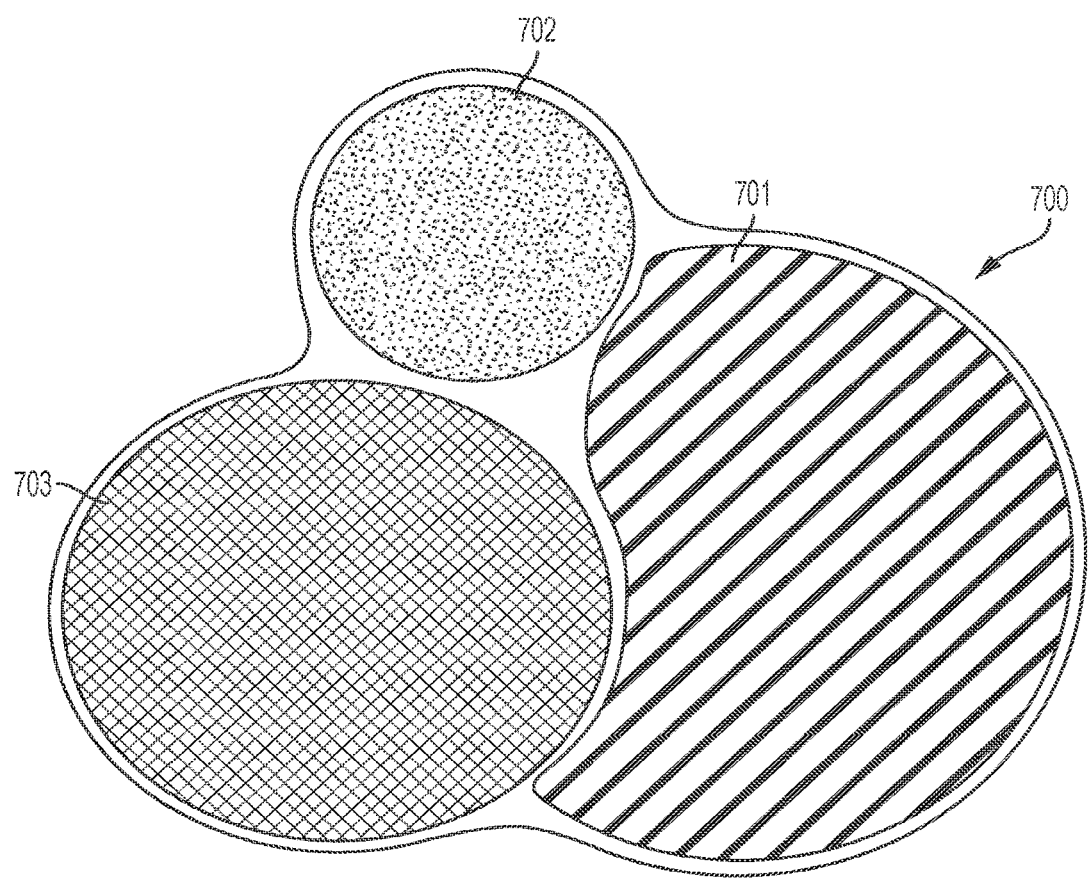
FIG. 7 is a cross-sectional view of an integrated fluid conduit with a non-circular outer duct profile, according to an embodiment of the invention.

In one embodiment, a non-circular outer duct profile as shown in FIG. 7 that is capable of lowering the duct weight. The non-circular integrated duct shown in FIG. 7 provides a rigid conduit with an external surface that is continuous around the periphery of the conduit. In this arrangement, the outer circumference of the duct 700 is continuous so that the individual lines 701, 702, and 703 within the duct 700 are integrated with each other. This duct design provides a rigid series of ducts in a lower weight arrangement suitable for a specific lower engine vibration environment or where alternate damping methods/devices are available for use. In one embodiment, the integrated fluid conduit of the present invention may be utilized as the fluid conduit in a gas turbine/jet engine hydraulic system as shown in FIG. 9. In a conventional arrangement shown in FIG. 8, an engine driven pump 807 is mounted on the auxiliary gear box 804 on the engine case 805. The suction/return line 801, case drain line 802, and pressure/supply line 803 are routed from the engine driven pump 807 to the aircraft interface or pylon attachment 806. Typically a combination of flexible hoses and rigid lines is utilized for each hydraulic line, trading off between ease of assembly offered by a hose and its higher weight and cost. The integrated fluid conduit according to this embodiment of the present invention replaces the rigid section of the three hydraulic lines—pressure/supply line 803, suction/return line 801 and case drain line 802—with a single integrated fluid conduit. As shown in FIG. 9, the formerly separate rigid/metallic lines 801, 802 and 803 are consolidated into an integrated line 909, which includes three interior conduits 901, 902, and 903. The design of the integrated conduit 909 may have a circular outer perimeter as shown in FIG. 3 discussed above. Alternatively, the integrated conduit may have a non-circular outer perimeter as shown in FIG. 7.

Figure 2:
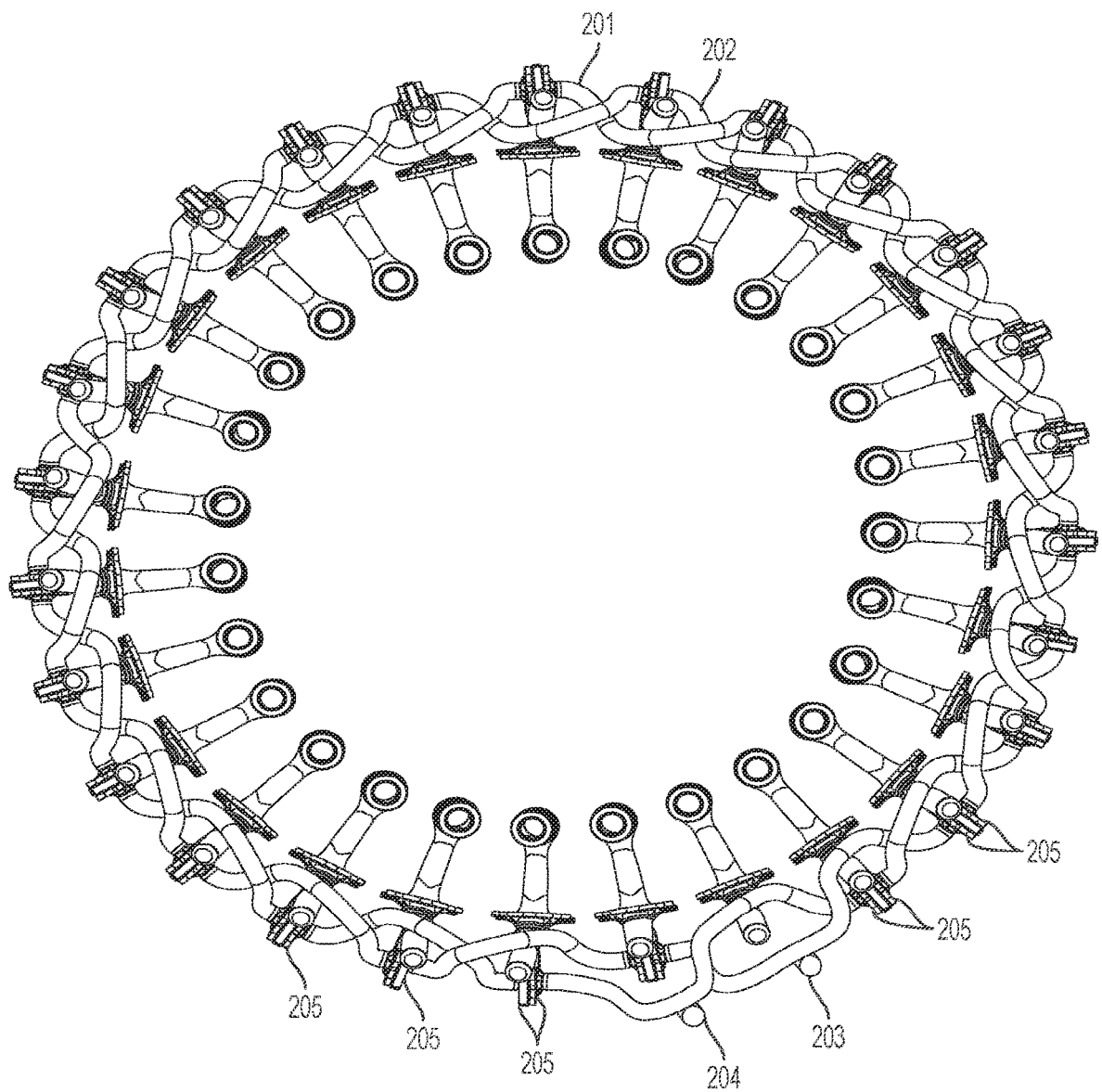
FIG. 2 is a schematic view of an integrated fuel delivery system configuration utilizing the integrated fluid conduit of FIG. 1.
Figure 8:
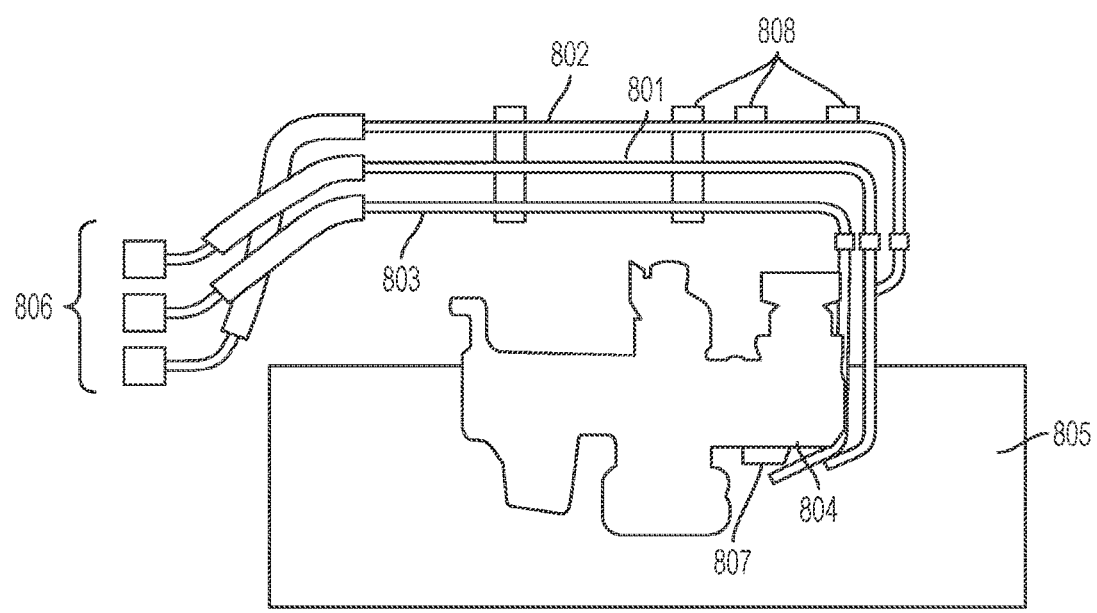
FIG. 8 is a hydraulic system assembled/mounted on a gas turbine engine of an aircraft including the hydraulic lines.
Figure 9:
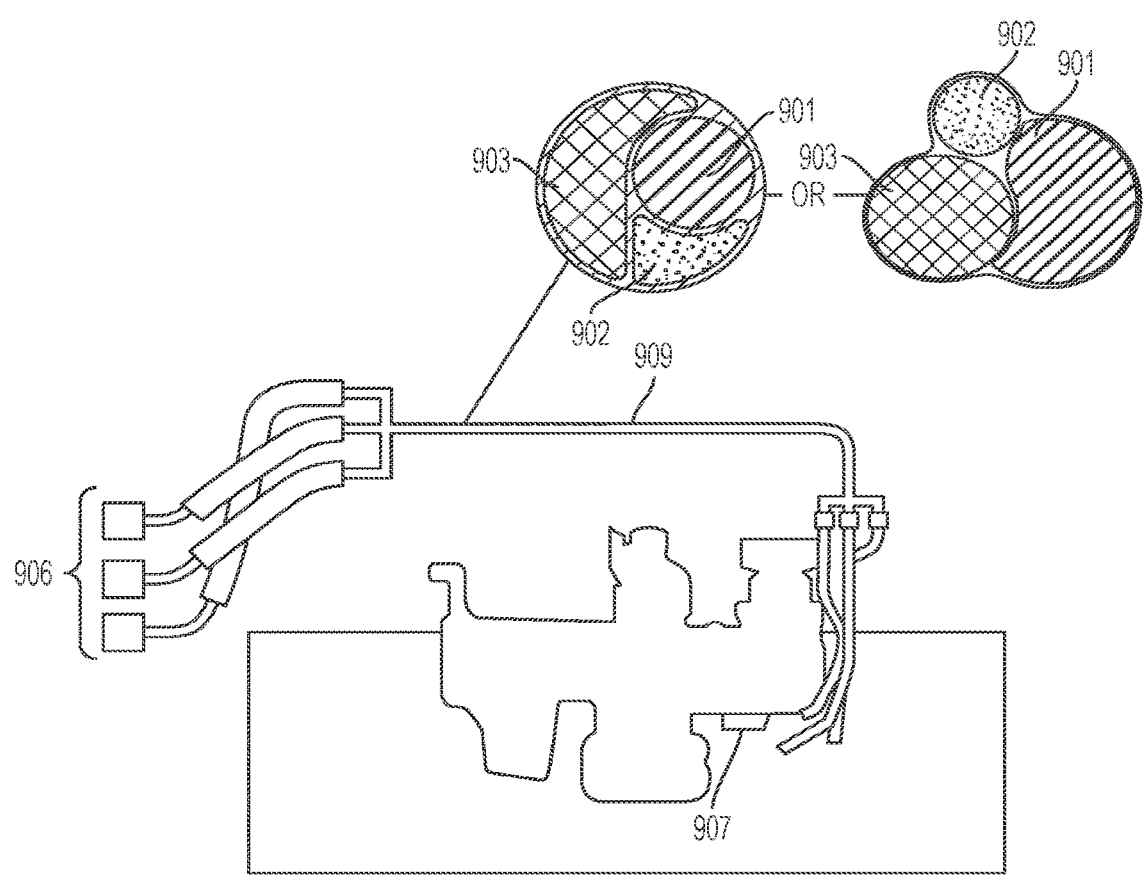
FIG. 9 shows how a single integrated conduit can replace a portion of the hydraulic lines in the hydraulic system shown in FIG. 8.

The integrated conduit shown in FIG. 9 simplifies the packaging and the need for support brackets 808 shown in FIG. 8, and significantly lowers part count. This design may include several bends in the conduit path to allow a feasible routing from the engine driven hydraulic pump 907 to the pylon 906. The design may include several connected pieces of integrated duct between the hydraulic pump 907 and pylon 906 because of manufacturing constraints. For example, current additive manufacturing stations/tables have limited space in which to build lengthy conduits. Interconnecting hardware may be required for a continuous fluid channel embodiment. The additive manufacturing methods discussed above offer flexibility in forming/molding the inlets and outlets of each distinct fluid channel/passage of an integrated conduit to desired shape. This desired shape allows attachment/interface with standard or non-standard fluid fittings/end-pieces. The integrated fluid conduit may have substantially circular ends for standard interface hardware such as fluid fittings/joints or it may have inlet/outlet taps in the run/route of the conduit for interface hardware on each channel/passage, as shown in FIG. 2.

The entire hydraulic fluid conduit in the above system may be formed from a single integrated conduit, or from individual sections. For example, the portions of the hydraulic system requiring significant curvature of the conduit may preferably be manufactured according to the present invention. The hydraulic system may have at least two fluid passages within the fluid conduit, but may alternatively have several fluid passages depending on design requirements. Further, portions of the hydraulic system may be made from an integrated conduit having one specified geometry, while other portions of the hydraulic system are made from integrated conduit having a different cross sectional geometry.

The integrated conduits of the present invention may be manufactured according to an additive printing technique, including selective laser sintering (SLS), direct metal laser sintering (DMLS) and three dimensional printing (3DP). The materials can include stainless steel, aluminum, titanium, Inconel 625, Inconel 718, cobalt chrome, among other metal materials. In each of these powder based fabrication methods, powdered material is melted or sintered to form each part layer. For example, the SLS process utilizes powdered plastic materials that are selectively sintered by a laser layer-by-layer. Other types of additive manufacturing techniques include 3D printing including stereolithography (SLA), jetted photopolymer, or ink jet printing. Other types of additive printing include solid-based processes, which use non-powdered materials that are layered one on top of another and subsequently cut out. These methods includes laminated object manufacturing (LOM) or fused deposition modeling (FDM). Any of the above techniques may be utilized to form the integrated conduit having the required curvature for a particular application. Exemplary embodiments of a fluid conduit and method for manufacturing the same are described above in detail. The methods and systems are not limited to the specific embodiments described herein, but rather components of the methods and systems may be utilized independently and separately from other components described herein. For example, the methods and systems described herein may have other industrial and/or consumer application and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims. The foregoing detailed description sets for integrated fluid conduits and methods of fabricating the same by way of example and not by way of limitation. The description should clearly enable one of ordinary skill in the art to make and use the integrated fluid conduits, and the description sets forth several embodiment, adaptations, variations, alternatives, and uses of the fluid conduits, including what is presently believed to be the best mode thereof. The fluid conduit is described herein as being applied to a few preferred embodiments, namely a fuel conduit of a fuel delivery system in a gas turbine engine and a hydraulic system on a gas turbine engine interfacing with a jet airplane. However, it is contemplated that the fluid conduit and method of fabricating the fluid conduit may have general application in a broad range of systems and/or a variety of commercial, industrial, and/or consumer applications other than fuel flow or hydraulic systems of gas turbine engines.

We claim:
1. A fuel delivery manifold system comprising:
an annular fluid conduit having a length defining an opening and at least one bend, the annular fluid conduit comprising:
an outer perimeter that defines a central axis of the annular fluid conduit;
a first circular interior fluid conduit having a center that is offset from the central axis of the annular fluid conduit; and
a second interior fluid conduit separate from the first circular interior fluid conduit, and
an annular array of fuel delivery nozzles interconnected by the annular fluid conduit, each of the fuel delivery nozzles extending from different portions of the annular fluid conduit along the length of the annular fluid conduit, each fuel delivery nozzle of the annular array of fuel delivery nozzles extending radially inwardly toward a center of the opening.

2. The fuel delivery manifold system as claimed in claim 1, wherein the outer perimeter is circular.

3. The fuel delivery manifold system as claimed in claim 2, further comprising a third interior fluid conduit.

4. The fuel delivery manifold system as claimed in claim 3, wherein the second and third interior fluid conduits are non-circular and together with the first circular interior fluid conduit occupy at least 90% of the volume of the annular fluid conduit.

5. The fuel delivery manifold system as claimed in claim 1, wherein the annular fluid conduit has a non-circular outer perimeter.

6. The fuel delivery manifold system as claimed in claim 1, wherein the annular fluid conduit is an integrated fuel conduit that delivers fuel to fuel nozzles of a gas turbine engine.

7. The fuel delivery manifold system of claim 5, wherein the first circular interior fluid conduit is a main fuel line.

8. The fuel delivery manifold system as claimed in claim 5, wherein the second interior fluid conduit is a pilot secondary fuel line.

9. The fuel delivery manifold system as claimed in claim 1, wherein the annular fluid conduit is an integrated hydraulic fluid conduit.

10. The fuel delivery manifold system as claimed in claim 1, wherein the integrated hydraulic fluid conduit is part of a hydraulic system of a gas turbine engine for an airplane.

11. A fuel delivery manifold system comprising:
an annular fluid conduit having a length and at least one bend, the annular fluid conduit comprising:
an outer perimeter that defines a central axis of the annular fluid conduit;
a first interior fluid conduit; and
a second interior fluid conduit separate from the first interior fluid conduit, and
an annular array of fuel delivery nozzles interconnected by the annular fluid conduit, each of the fuel delivery nozzles extending from different portions of the annular fluid conduit along the length of the annular fluid conduit, each fuel delivery nozzle of the annular array of fuel delivery nozzles being equidistantly spaced apart from one another along an entire length of the annular fluid conduit,
wherein the first interior fluid conduit and the second interior fluid conduit are non-concentric.

12. The fuel delivery manifold system as claimed in claim 11, wherein the outer perimeter is circular.

13. The fuel delivery manifold system as claimed in claim 11, further comprising a third interior fluid conduit.

14. The fuel delivery manifold system as claimed in claim 13, wherein the second and third interior fluid conduits are non-circular and together with the first interior fluid conduit occupy at least 90% of the volume of the annular fluid conduit.

15. The fuel delivery manifold system as claimed in claim 11, wherein the annular fluid conduit has a non-circular outer perimeter.

16. The fuel delivery manifold system as claimed in claim 11, wherein the annular fluid conduit is an integrated fuel conduit that delivers fuel to fuel nozzles of a gas turbine engine.

17. The fuel delivery manifold system as claimed in claim 15, wherein the first interior fluid conduit is a main fuel line.

18. The fuel delivery manifold system as claimed in claim 15, wherein the second interior fluid conduit is a pilot secondary fuel line.

19. The fuel delivery manifold system as claimed in claim 11, wherein the annular fluid conduit is an integrated hydraulic fluid conduit.

20. The fuel delivery manifold system as claimed in claim 11, wherein the integrated hydraulic fluid conduit is part of a hydraulic system of a gas turbine engine for an airplane.

* * * * *